United States Patent
Ponnuswamy

(10) Patent No.: US 9,167,457 B2
(45) Date of Patent: Oct. 20, 2015

(54) MEASURING AND DISPLAYING WIRELESS NETWORK QUALITY

(75) Inventor: Subburajan Ponnuswamy, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 368 days.

(21) Appl. No.: 13/080,539

(22) Filed: Apr. 5, 2011

(65) Prior Publication Data

US 2011/0243020 A1     Oct. 6, 2011

Related U.S. Application Data

(60) Provisional application No. 61/321,210, filed on Apr. 6, 2010, provisional application No. 61/321,179, filed on Apr. 6, 2010, provisional application No. 61/321,214, filed on Apr. 6, 2010.

(51) Int. Cl.
*H04W 24/08* (2009.01)
*H04L 12/24* (2006.01)
*H04L 12/26* (2006.01)
*H04W 24/10* (2009.01)
(Continued)

(52) U.S. Cl.
CPC ............ *H04W 24/08* (2013.01); *H04L 41/22* (2013.01); *H04L 43/08* (2013.01); *H04W 24/10* (2013.01); *H04W 72/0446* (2013.01); *H04W 72/082* (2013.01); *H04W 72/00* (2013.01); *H04W 84/12* (2013.01); *H04W 88/10* (2013.01)

(58) Field of Classification Search
CPC ......... H04L 1/18; H04L 1/1806; H04L 41/22; H04L 43/08; H04W 24/08; H04W 24/10; H04W 72/00; H04W 84/12

USPC .................. 370/252, 329, 332–334; 455/436
See application file for complete search history.

(56) References Cited

U.S. PATENT DOCUMENTS 6,463,287 B1 * 10/2002 Wegner ..................... 455/456.1
6,850,735 B2    2/2005 Sugar et al.
(Continued)

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Computer Society, IEEE Std 802.11 (2007) 1232 pages.

(Continued)

*Primary Examiner* — Brian J Gillis
*Assistant Examiner* — Amy Ling

(57) ABSTRACT

Methods of calculating and displaying quality metrics on a wireless digital network such as a network using IEEE 802.11 Wi-Fi standards. The quality metric calculation assigns weights only to factors which are observed above a threshold, combining multiple factors into a scalar result. The quality metric is derived from the weighted sum of two or more parameters such as: noise floor offset, channel busy indication, adjacent and overlapping channel interference, interferer duty-cycle, frame retry-rate, PHY error rate and CRC error rate. Quality spectrograms may be used to display calculated quality metrics across a channel, channel range, or frequency band, plotting calculated quality metric versus frequency or channel range over a configurable time frame. Using known locations of radios, quality ranges are mapped onto visual representations such as contour lines, shading density, or color codes, and overlayed for example over floor plans or other site representations.

27 Claims, 3 Drawing Sheets

(51) Int. Cl.
*H04W 72/04* (2009.01)
*H04W 72/08* (2009.01)
H04W 72/00 (2009.01)
H04W 84/12 (2009.01)
H04W 88/10 (2009.01)

(56) References Cited

U.S. PATENT DOCUMENTS

| | | | |
|---|---|---|---|
| 7,079,812 B2 | 7/2006 | Miller et al. | |
| 7,184,777 B2 | 2/2007 | Diener et al. | |
| 7,460,837 B2 | 12/2008 | Diener | |
| 7,596,181 B2 | 9/2009 | Chang et al. | |
| 7,633,901 B2* | 12/2009 | Yuen et al. | 370/329 |
| 7,653,020 B2 | 1/2010 | Roberts | |
| 7,715,800 B2 | 5/2010 | Sinha | |
| 7,929,508 B1 | 4/2011 | Yucek et al. | |
| 7,940,794 B2 | 5/2011 | Zhang et al. | |
| 8,340,578 B2* | 12/2012 | Tolentino et al. | 455/41.2 |
| 8,457,023 B2 | 6/2013 | Norlen et al. | |
| 8,625,436 B2 | 1/2014 | Ponnuswamy | |
| 8,885,499 B2 | 11/2014 | Ponnuswamy | |
| 9,014,021 B2 | 4/2015 | Ponnuswamy | |
| 2002/0041622 A1 | 4/2002 | Steed et al. | |
| 2002/0191564 A1* | 12/2002 | Kuo | 370/333 |
| 2003/0117956 A1* | 6/2003 | Lee | 370/232 |
| 2004/0013128 A1 | 1/2004 | Moreton et al. | |
| 2004/0023674 A1 | 2/2004 | Miller | |
| 2004/0028003 A1 | 2/2004 | Diener et al. | |
| 2004/0028123 A1 | 2/2004 | Sugar et al. | |
| 2004/0137915 A1 | 7/2004 | Diener et al. | |
| 2004/0185861 A1 | 9/2004 | Domon et al. | |
| 2004/0203392 A1* | 10/2004 | Hsu et al. | 455/62 |
| 2004/0208133 A1* | 10/2004 | Jay et al. | 370/252 |
| 2005/0053094 A1* | 3/2005 | Cain et al. | 370/469 |
| 2005/0059400 A1* | 3/2005 | Jagadeesan et al. | 455/436 |
| 2005/0111415 A1 | 5/2005 | Soomro et al. | |
| 2005/0159109 A1 | 7/2005 | Kivekas et al. | |
| 2005/0227625 A1 | 10/2005 | Diener | |
| 2006/0079286 A1 | 4/2006 | Ochi et al. | |
| 2006/0089149 A1 | 4/2006 | Kizu et al. | |
| 2007/0104129 A1* | 5/2007 | Yang et al. | 370/329 |
| 2007/0165535 A1* | 7/2007 | Zou et al. | 370/252 |
| 2008/0025259 A1* | 1/2008 | Ponnuswamy et al. | 370/331 |
| 2008/0151751 A1* | 6/2008 | Ponnuswamy et al. | 370/232 |
| 2008/0200195 A1* | 8/2008 | Abe et al. | 455/501 |
| 2008/0227401 A1* | 9/2008 | Scherzer et al. | 455/67.13 |
| 2008/0279093 A1* | 11/2008 | Hassan et al. | 370/216 |
| 2009/0003413 A1 | 1/2009 | Jang et al. | |
| 2009/0310497 A1* | 12/2009 | Wakamatsu | 370/252 |
| 2009/0313520 A1* | 12/2009 | Chung et al. | 714/751 |
| 2010/0075704 A1 | 3/2010 | Mchenry et al. | |
| 2010/0118695 A1 | 5/2010 | Shellhammer et al. | |
| 2010/0124886 A1 | 5/2010 | Fordham et al. | |
| 2011/0145405 A1* | 6/2011 | Vijayaraghavan | 709/224 |
| 2014/0153428 A1 | 6/2014 | Ponnuswamy | |

OTHER PUBLICATIONS

IEEE Standard for Information technology—Telecommunications and information exchange between systems—Local and metropolitan area networks—Specific requirements Part 3: Carrier Sense Multiple Access with Collision Detection (CSMA/CD) access method and Physical Layer specifications (2008) Section One, 671 pages.

IEEE Standard for Information technology—Telecommunications and information exchange between systems—Local and metropolitan area networks—Specific requirements Part 3: Carrier Sense Multiple Access with Collision Detection (CSMA/CD) access method and Physical Layer specifications (2008) Section Two, 790 pages.

IEEE Standard for Information technology—Telecommunications and information exchange between systems—Local and metropolitan area networks—Specific requirements Part 3: Carrier Sense Multiple Access with Collision Detection (CSMA/CD) access method and Physical Layer specifications (2008) Section Three, 315 pages.

IEEE Standard for Information technology—Telecommunications and information exchange between systems—Local and metropolitan area networks—Specific requirements Part 3: Carrier Sense Multiple Access with Collision Detection (CSMA/CD) access method and Physical Layer specifications (2008 ) Section Four, 586 pages.

IEEE Standard for Information technology—Telecommunications and information exchange between systems—Local and metropolitan area networks—Specific requirements Part 3: Carrier Sense Multiple Access with Collision Detection (CSMA/CD) access method and Physical Layer specifications (2008) Section Five, 615 pages.

IEEE Standard for Local and metropolitan area networks, Part 16: Air Interface for Broadband Wireless Access Systems, Amendment 1: Multiple Relay Specification, IEEE Computer Society, IEEE Std 802.16j (2009) 314 pages.

IEEE Standard for Local and metropolitan area networks, Part 16: Air Interface for Broadband Wireless Access Systems, Amendment 2: Improved Coexistence Mechanisms for License-Exempt Operation, IEEE Computer Society, IEEE Std 802.16h (2010) 223 pages.

* cited by examiner

MEASURING AND DISPLAYING WIRELESS NETWORK QUALITY

CROSS-REFERENCES TO RELATED APPLICATIONS

This application claims the benefit of priority on U.S. Provisional Patent Application No. 61/321,210 filed Apr. 6, 2010 and entitled "Automatic conversion of access points to spectrum monitors and hybrid mode access point", U.S. Provisional Patent Application No. 61/321,179 filed Apr. 6, 2010 and entitled "Measuring and displaying wireless network quality", and U.S. Provisional Patent Application No. 61/321,214 filed Apr. 6, 2010 and entitled "Displaying a Wideband spectrum using a narrowband receiver", all incorporated herein by reference.

BACKGROUND OF THE INVENTION

The present invention relates to wireless digital networks, and in particular, to the problem of measuring and displaying quality metrics in wireless digital networks.

Wireless digital networks are becoming ubiquitous in enterprises, providing secure and cost-effective access to resources. Those networks usually have a plurality of access points (AP) deployed through the enterprise. WiFi networks operating in accordance with IEEE 802.11 standards are examples of such networks.

Unfortunately, the frequencies used by these networks are shared. They are shared not only among the wireless networks themselves, but also with other non-network radiators. As an example, the IEEE 802.11 standards specify a number of channels for use on the 2.4 GHz band. These channels overlap, so Wi-Fi network devices operating on channels 1 and 2 may interfere with each other as they overlap in the frequency spectrum they use. Other services also share the same spectrum. Numerous Bluetooth wireless devices operate in the 2.4 GHz band. The 2.4 GHz band is also used for cordless phones, wireless video and audio links, and other wireless entertainment devices. In addition to these and other intentional radiators, the 2.4 GHz band is also occupied by microwave ovens, which may emit signals capable of interfering with wireless network operation. Similar issues exist with the 5 GHz band.

Operating a wireless digital network such as a Wi-Fi network often involves dealing with sources of interference to the network, and dealing with them in an ongoing and evolving manner. A Wi-Fi network may be working fine one day, and be impacted the next; was it the new microwave oven in the break room? Was it the new Bluetooth headsets for use with desk phones? Or is it the new coffee shop which opened up across the street?

What is needed are tools in the wireless network to help measure network quality, and to display this quality information.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of calculating and displaying quality metrics on a wireless digital network such as a network using IEEE 802.11 Wi-Fi standards. Quality metrics are calculated on a per-channel basis. While many factors may go into a quality calculation, not all factors may have significance. Thus the quality metric calculation assigns weights only to the factors which are observed above a threshold, and combines multiple factors to form a scalar result. The quality metric is derived from the weighted sum of two or more parameters such as: adjacent channel interference (ACI), Co-channel interference (CCI), noise floor offset, channel busy indication, overlapping channel interference, interferer duty-cycle, frame retry-rate, PHY error rate and CRC error rate. Quality spectrograms may be used to display calculated quality metrics across a channel, channel range, or frequency band, plotting calculated quality metric versus frequency or channel range over a configurable time frame. Using known locations of radios, quality ranges are mapped onto visual representations such as contour lines, shading density, or color codes, and overlayed for example over floor plans or other site representations.

Figure 1:
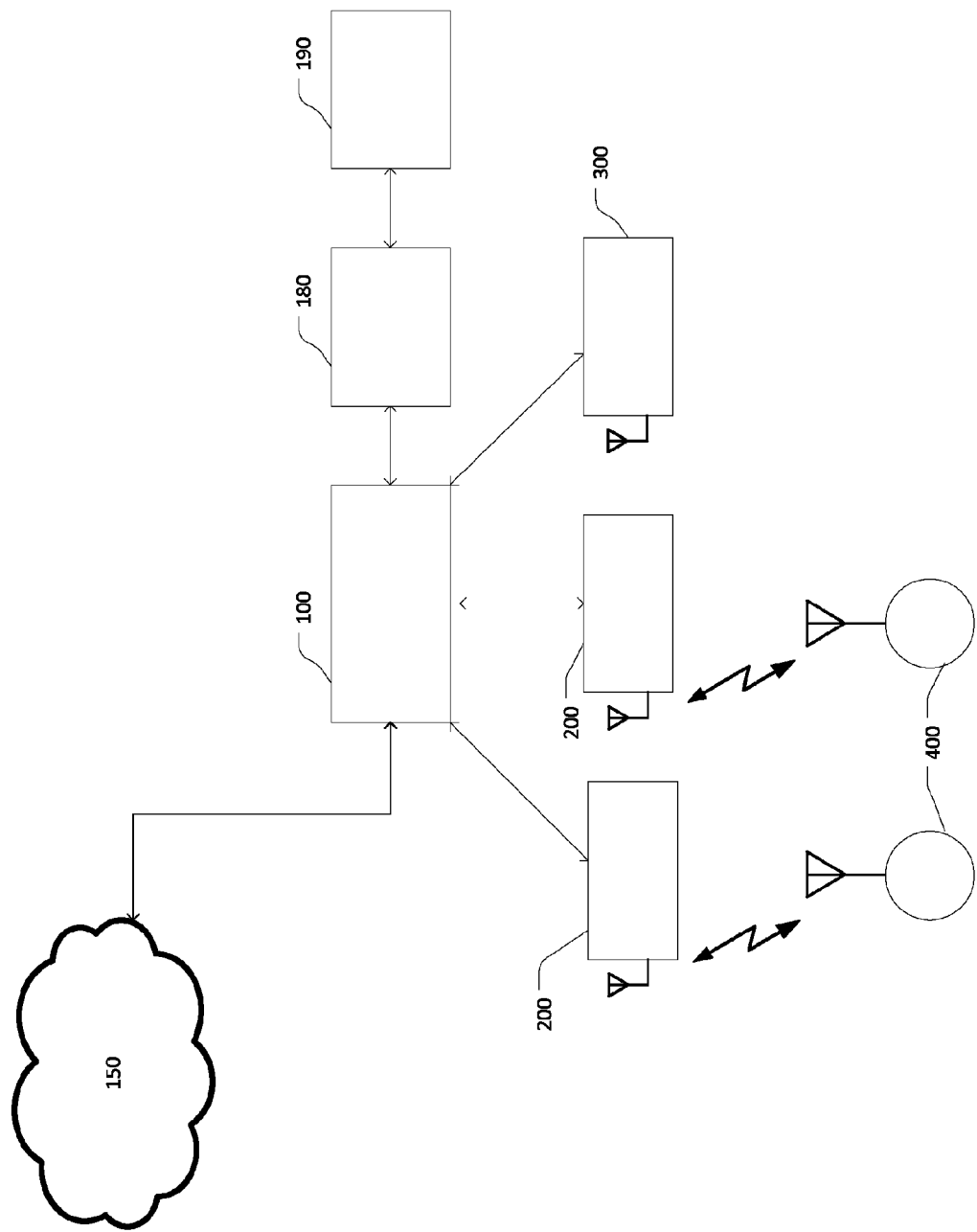
FIG. 1 shows devices in a wireless network.

FIG. 1 shows a network in which controller 100 communicates with a digital network such as the Internet 150. Controller 100 also supports devices such as access points (AP) 200 and spectrum monitors (SM) 300. Wireless client devices 400 connect to APs 200 and access services such as the Internet 150 through controller 100.

Also shown in FIG. 1 is measurement process 180 and display 190. While shown as a separate device communicating with controller 100, the measurement process may operate within controller 100, or on any suitable computing device attached to the network.

Figure 2:
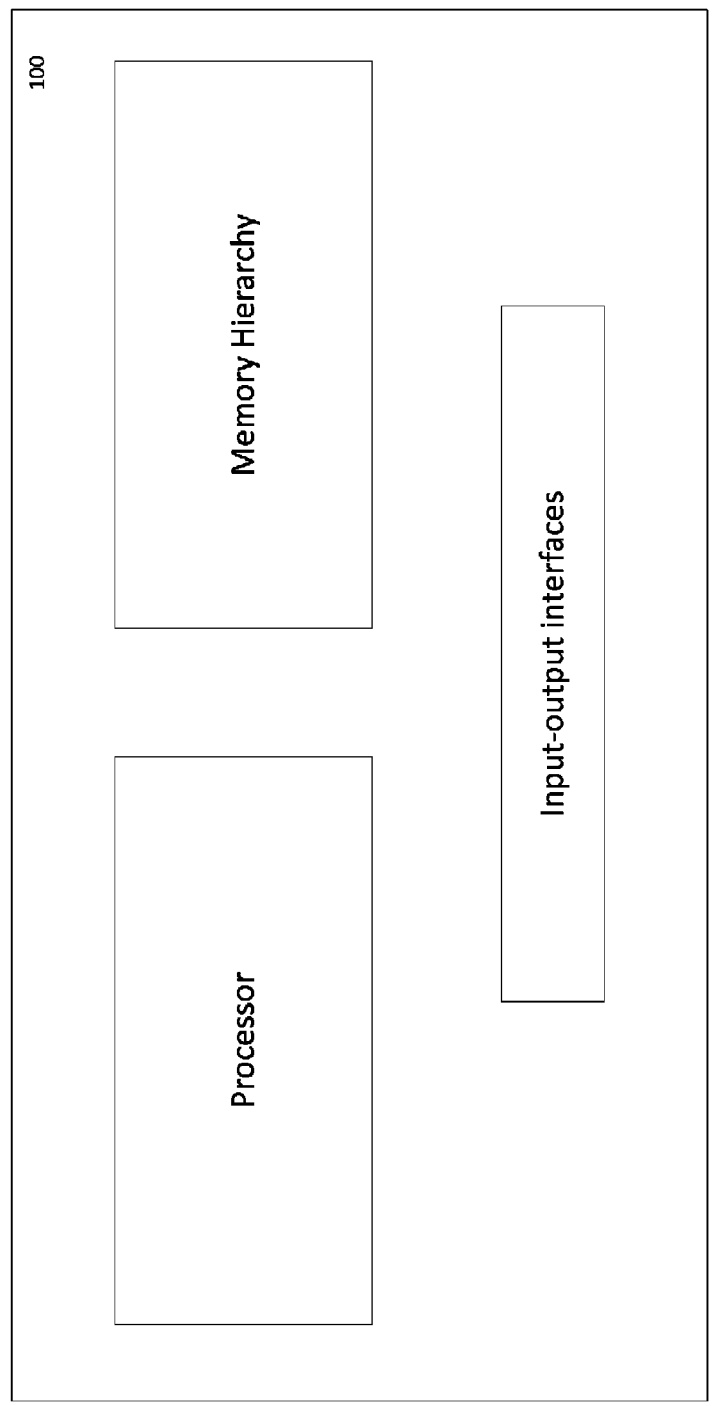
FIG. 2 shows a block diagram of an example device according to embodiments of the present technology.

As is known to the art, controller 100, APs 200, and spectrum monitor 300 are purpose-made digital devices, each containing a processor, memory hierarchy, and input-output interfaces, as shown in FIG. 2. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for Wired connections to other network devices such as switches, or to a controller. Wireless interfaces may be WiMAX, 3G, 4G, and/or IEEE 802.11 wireless interfaces. In one embodiment of the invention, controllers, spectrum monitors, and APs operate under control of a LINUX operating system, with purpose-built programs providing host controller and access point functionality.

Wireless client devices 400 contain a processor, memory hierarchy, and a number of interfaces including a wireless interface for communicating with APs 200. Typical wireless client devices include personal computers, handheld and tablet computers, Wi-Fi phones, wireless barcode scanners, and the like.

According to the present invention, measurements from devices in the wireless network, which include Access Points (AP) 200, spectrum monitors (SM) 300, and may also include data collected from wireless client devices 400 are used to form quality metrics for the wireless network. Collected measurement data may be sent to a measurement process 180 on the network, such as a process running on controller 100 or on a user laptop 400. The computation required to produce the various parameters from the underlying collected data may be distributed among the collecting device, such as the AP, SM, or client device, connecting APs, and measurement process 180. The quality metric is derived from the weighted sum of two or more of these parameters such as: adjacent channel interference (ACI), Co-channel interference (CCI), noise floor offset, channel busy indication, overlapping channel interference, interferer duty-cycle, frame retry-rate, PHY error rate and CRC error rate.

Adjacent Channel Interference (ACI) is defined in terms of the power level (in dB) contributed by extraneous signals on an adjacent channel. The term "adjacent" refers to all channels that overlap, adjacent channels, and channels within a frequency offset and therefore nonadjacent. While the ACI power level is an important indication of interference, the aggregate duty-cycle of the devices that contributed to the ACI is a more accurate measure of the impact of ACI on the quality of a wireless channel.

A spectrum monitor (SM) scans channels in a frequency band to collect spectral information along with information about the wireless (e.g., IEEE 802.11) devices on each channel. The signal strength of each device can be measured during such a scan, for example by sampling received signal strength indicator (RSSI) levels. The actual level of ACI introduced by each detected device on every other channel, including adjacent, overlapping and non-adjacent channels is calculated by applying the appropriate attenuation values to the measured signal as is known to the art.

The SM estimates the duty-cycle of each device it detects based on the activity level observed during the channels and the number and type of other devices connected to that device. Once the duty-cycle of a device on a home channel is known, the duty-cycle information along with the signal strength is used to calculate the ACI-duty cycle of that device on each channel affected by that device.

For each channel, an aggregate ACI duty cycle is calculated if the extraneous power exceeds the noise floor of that channel by a threshold sufficient to affect the transmission of any modulated signal. The aggregation method does not simply add all the device duty cycles since some of these devices responsible for ACI operating in various frequencies may overlap in time. An overlapping weight is used to aggregate only portions of the calculated duty cycle. The overlapping weight is calculated based on the center frequencies of the devices and the amount of overlap among devices affecting the channel.

The quality of a channel is a measure of the ability of the wireless channel to support high quality and high capacity wireless communication. The quality is represented as a single number within a specific range (e.g., 0 through 1 or 0 though 100). The higher the channel quality, the better the ability of that channel to support wireless communication for data, voice, video and other traffic. The quality of the channel is affected by the level of interference from interferers, interference from other channels, and the RF environment, among other factors. Quality according to the present invention uses observable parameters from a wireless radio such as the IEEE 802.11 radio present in APs, SMs, or wireless client devices to calculate a single number that reflects the quality of the channel.

In the following exposition, unless otherwise noted, references to data collected from radios may include radios such as IEEE 802.11 radios in access points (APs), spectrum monitors (SMs), or in wireless client devices.

According to the present invention, the quality metric is derived from the weighted sum of two or more of the following parameters: adjacent channel interference (ACI), Co-channel interference (CCI), noise floor offset, channel busy indication, overlapping channel interference, interferer duty-cycle, frame retry-rate, PHY error rate and CRC error rate.

The noise floor on a channel is affected by many factors including a high level of co-channel interference, presence of certain types of interferers, thermal conditions at or near the receiver and adjacent channel interference. The nominal noise floor of a wireless receiver at ambient temperature is known. The noise floor is measured at regular intervals or on demand at a wireless radio and the difference between the actual (measured) noise floor and nominal noise floor is the noise floor offset. The noise floor offset is normalized to the same range used for the quality metric such as 0-1 or 0-100 to generate a normalized noise floor. The normalization uses an upper threshold of the noise floor offset, where all values higher than this value are assigned the maximum value (e.g., 1 or 100). Noise floor offsets less than this threshold are mapped to a specific value less than the maximum value.

The channel busy time is available from most of the radios which implement a listen-before-talk scheme. The channel busy time indicates the amount of time the channel was considered busy by the radio, and includes the time the radio was receiving transmissions from other radios, the time the interferers were active on that channel, and the time interference energy from other channels were affecting the channel. If the primary contributor to channel busy time is transmissions on this channel, that does not necessarily indicate that the channel quality is bad. The component of the channel busy time contributed by the interferers on the channel and by interference energy from other channels affects the quality of the channel. The duty-cycle of the interferers on the current channel is calculated based on the type of the interferer, pulse duration, pulse interval, occupied bandwidth, and occupancy time estimated by the classifier. The interference energy from other channels is calculated as ACI duty-cycle described above. The contribution to the channel busy time from the transmissions on the current channel is calculated directly by accumulating the rate and duration information from each received frame or by other means supported by specific radios. The channel busy time due to interference is thus calculated from these measured values by excluding the channel busy time due the legitimate transmissions on the channel from the total channel busy time. The calculated channel busy time is converted to percentage and then normalized to the same range used by the quality metric if necessary.

The frame error rate calculation is known to the art, where a ratio of the retries to successful transmissions can be calculated by observing the decoded wireless transmissions on the channel. Many variations of the frame error rate calculations exist including those that take into account the modulation rate and duration of the frames being retried.

One embodiment of frame rate error calculation uses specific knowledge of the retry and rate control algorithms to exclude invalid retries from being counted as retires for the purpose of the frame error calculation. Each wireless device has some form of "rate control" or "rate adaptation" algorithm, where the device would try a higher modulation and coding than the one that it is currently using in an attempt to improve the modulation and coding rate being used. However, this attempt may fail and result in retries if the link quality between the communicating devices is only sufficient to support the (lower) rate being used. This method keeps track of the current rate used for every link such as the one between a wireless client and an Access Point. Thus, retries are counted against the channel only if the retries occur at the current transmission rate or below. The rate-control induced retries are detected and excluded from the calculation. The retries observed due to certain management or control traffic may optionally be excluded from the retry rate estimate. For example, the rate of retries for IEEE 802.11 probe responses are very high due to the fact that the intended recipient may have switched channels and therefore not be able to acknowledge the frames. The frame error rate in percentage is normalized to the same range used by the quality metric.

Cyclic Redundancy Check (CRC) or similar mechanisms such as checksums are used to protect the integrity of frames transmitted through wireless media. The receiver discards frames that fail the CRC or other checksums. The presence of CRC errors in itself is not an indication of a problem. If a receiver (such as a spectrum monitor) is farther away from the actual transmitter and/or receiver, the received frames may appear as CRC errors while the intended recipient of the frame would be able to decode the frame reliably. In a CSMA network such as IEEE 802.11 network, some percentage of CRC errors are also expected and considered normal due to collisions. The method described optionally discounts CRC errors with weaker signal strength as well a percentage of CRC errors that is estimated to be typical of the network being monitored from the observed CRC errors to calculate the actual CRC error rate. Similar to the frame error rate, the CRC error rate is normalized to a unit used by the quality metric, if necessary.

The quality metric is based on a weighted sum and is calculated by assigning a weight between 0 and 1 to parameters including the normalized noise floor offset, channel busy time from interference or duty cycle of interferers, frame error rate, PHY error rate and CRC error rate. The sum of all the weights equals to 1. The weighted sum (weighted_sum) represents the part that reduces the quality of the channel. Since the upper end of the range is the best quality (e.g., 1 or 100=max_value), the quality metric will be the weighted sum subtracted from the maximum quality value (max_value−weighted_sum). When the weighted sum is zero, the channel is said to have the best quality.

In one method of quality calculation, since not all the factors affecting the channel quality may have significant presence on all channels and in all environments, the quality metric calculation dynamically assigns weights to only those factors which are observed above a threshold on a channel in order to provide an accurate measure of quality. For example, if there are no interference and no PHY errors, the channel quality metric is based on a weighted sum of normalized noise floor offset, frame error rate and CRC error rate. As in the general case, the sum of weights assigned to normalized noise floor offset, frame error rate and CRC error rate will equal to 1.

In another method, retry rate is not included in the quality metric calculation or a very low weight is assigned to the retry rate if the number of packets, including the first try and retries, are below a threshold. This method prevents a small sample of packers with a high retry rate from negatively skewing the quality metric.

In yet another method, the weighted sum assigns the full weight (1) to the parameter with highest value, if the value is above a threshold. All other parameters are assigned a weight of 0 (i.e., ignored). For example, on a 0-100 scale, if the highest value is the interference duty-cycle (e.g., 70) and is above a specified threshold (e.g., 40), the weighted sum will be 70. The quality would be 30 (100−70).

In yet another method, a parameter is included in the weighted sum calculation only if its value is greater than a certain percentage of the parameter with the maximum value. For example, on 0-100 scale, when only three parameters (e.g., normalized noise floor=10, interference duty cycle=60 and retry-rate=40) are considered for the weighted sum calculation and the specified threshold is 50%, only two parameters are used in the calculation. Since the parameter with the highest value is the normalized noise floor (60), the retry rate of 40 is greater than 50% of 60 (i.e., 30). However, the normalized noise floor of 10 is less than 30. Assuming equal weights, the normalized noised floor and retry rate will be assigned a weight of 0.5 each. The weighted sum will be 0.5×60+0.5×40=50. Therefore, the quality of the channel is 50 (100−50).

Link quality is a relative measure which measures the ratio of the actual modulation and coding rate used for a link to the expected modulation and coding rate of a link. A "link" is defined as the wireless communication link established between any two radios such as those between an AP and wireless client, or between two clients or two APs. The expected modulation and coding rate is calculated based on the measured or calculated Signal-to-Noise Ratio (SNR) of the link. The SNR of a link depends on the distance between the radios, the path loss introduced by the environment, noise floor, and the radiated power such as the equivalent isotropically radiated power (EIRP) on each end. The SNR can be asymmetrical, if the EIRP or the loss is different in each direction. Once the SNR of the link is known, the expected modulation and coding rate can be estimated. The SNR that is required to support the current modulation and coding rate use by the link can be similarly estimated. The difference between these two SNR values defines the quality of this wireless link.

A method for automatically identifying the reasons for any degradation of link quality uses specific information gathered on the channel as well as information about the specific link. The quality of the link may degrade based on a variety of reasons. For example, the behavior of the wireless device such as its rate control or rate adaptation algorithm or other factors such as localized interference that cannot be directly detected by the Spectrum Monitor an Access Point may cause the degradation of quality. The rate control behavior is analyzed based on the difference between link quality in each direction as well as the attempts by the client to transmit at specific rates and any anomalies that are detected. If the quality degradation is related to channel quality, an association is made based on the current channel quality, location of the client, and location of the interferer, it any. The frame transmission and error patterns are also analyzed to determine if the degradation in quality is due to possible localized interference. If an anomaly is detected, the identified reasons are provided to the user in the form of alerts or user interface icon.

A swept spectrogram is typically used to display spectral information such as real-time FFT or FFT duty cycle. In this method, a quality spectrogram is used to display the quality metric across a channel range or frequency band. The quality spectrogram plots the quality metric calculated according to the invention versus frequency or channel range over a configurable time frame.

It is assumed that the locations of certain radios, for example APs 200 and SMs 300 are known. Given radios in known locations, measurements from multiple radios may be combined by measurement process 180 to generate contours or shading on a representation of the area covered by the radios. This representation may be in the nature of a floor plan, a building layout, a map combining interior building features with exterior features such as APs located in parking lots and the like. This mapping process may include frequency-dependant propagation characteristics. Given a set of radios in known, fixed locations, the positions of other radios such as wireless client devices may be estimated using techniques such as relative signal strengths from the wireless client to radios at known locations. In this manner, data provided by wireless clients may be included in the measurement and contouring process.

A range of quality is mapped onto a visual indication such as different shading levels, contour lines, or color codes depending on the type of display 190 and rendering techniques used. Apart from providing visual indication of quality, when a pointing device such as a mouse is hovered over a point in the quality spectrogram, a popup or other display method may be used to provide details for the reason for the good or bad quality or anything in between, including the factors that contributed to the quality metric being displayed.

The quality metric may be overlaid on a building, floor, or site map with contour lines, shading, or color codes as the spectrogram to indicate the quality of the channels across a building, floor, or site. This provides a building, floor, or site wide view of the channel or link quality. The channel quality metric may be displayed based on the current wireless channel allocations where the metric displayed at a specific location on the map indicates the quality of the channel that provides primary coverage in that location. The quality display may also be displayed per-channel, where the entire building, floor, or site map displays the quality of a specific wireless channel.

Images for display may be generated on demand, or periodically. Periodically generated images may be stored for later retrieval and evaluation. These images may be combined to show performance over time of the network.

Images may also be generated based on triggering events. As an example, a continually running measurement process 180 in controller 100 may generate an image and send that image in an e-mail as an alert to an engineer if quality levels drop below a predetermined threshold.

Figure 3:
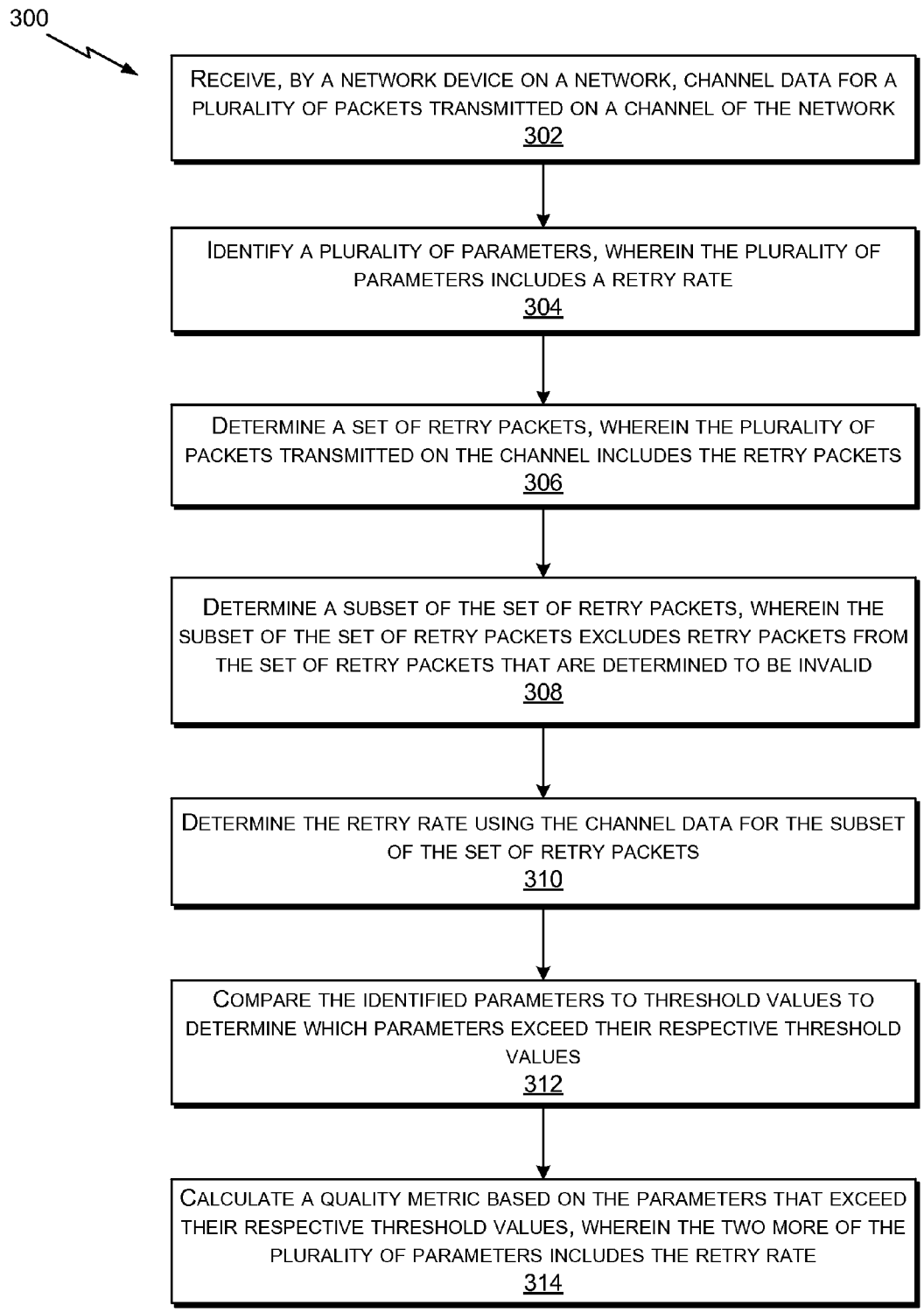
FIG. 3 shows a flow chart of an example method according to embodiments of the present technology.

FIG. 3 shows a flow chart of an example method according to embodiments of the present technology. Step 302 includes, for example, receiving, by a network device on a network, channel data for a plurality of packets transmitted on a channel of the network. Step 304 includes, for example, identifying a plurality of parameters, wherein the plurality of parameters includes a retry rate. Step 306 includes, for example, determining a set of retry packets, wherein the plurality of packets transmitted on the channel includes the retry packets. Step 308 includes, for example, determining a subset of the set of retry packets, wherein the subset of the set of retry packets excludes retry packets from the set of retry packets that are determined to be invalid. Step 310 includes, for example, determining the retry rate using the channel data for the subset of the set of retry packets. Step 312 includes, for example, comparing the identified parameters to threshold values to determine which parameters exceed their respective threshold values. Step 314 includes, for example, calculating a quality metric based on the parameters that exceed their respective threshold values, wherein the two more of the plurality of parameters includes the retry rate.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A computer-implemented method, comprising:
receiving, by a network device on a network, channel data for a plurality of packets transmitted on a channel of the network;
identifying a plurality of parameters, wherein the plurality of parameters includes a retry rate;
determining a set of retry packets, wherein the plurality of packets transmitted on the channel includes the retry packets;
determining a subset of the set of retry packets, wherein the subset of the set of retry packets excludes retry packets from the set of retry packets that are determined to be invalid;
determining the retry rate using the channel data for the subset of the set of retry packets;
comparing the identified parameters to threshold values to determine which parameters exceed their respective threshold values; and
calculating a quality metric based on the parameters that exceed their respective threshold values, wherein the two more of the plurality of parameters includes the retry rate.

2. The method of claim 1, further comprising:
setting a threshold transmission rate for the set of retry packets transmitted on the channel,
wherein determining the subset of the set of retry packets includes determining which retry packets are transmitted at or below the threshold transmission rate.

3. The method of claim 2, wherein determining the subset of the set of retry packets includes excluding invalid retry packets from the set of retry packets transmitted above the threshold transmission rate.

4. The method of claim 1, wherein determining the subset of the set of retry packets includes excluding invalid retry packets from the set of retry packets based on management or control traffic.

5. The method of claim 1, wherein calculating the quality metric includes using a noise floor offset for the channel or an interference measure for the channel.

6. The method of claim 5, wherein when calculating the quality metric includes using the noise floor offset, the noise floor offset is computed based on a difference between a measure noise floor value and a nominal noise floor value.

7. The method of claim 1, wherein calculating the quality metric includes assigning a weight to a value representing the retry rate and assigning a weight to a value representing another parameter of the plurality of parameters.

8. The method of claim 7, wherein calculating the quality metric includes calculating a weighted sum of the parameters using the weight assigned to the retry rate, the value assigned to the retry rate, the weight assigned to another parameter, and the value representing another parameter.

9. The method of claim 7, wherein the sum of the weights assigned to the parameters used to analyze a channel quality of the channel equals 1.

10. A computing device, comprising:
one or more processors; and
a memory having instructions stored thereon, which when executed by the one or more processors, cause the computing device to perform operations including:
receiving, by a network device on a network, channel data for a plurality of packets transmitted on a channel of the network;
identifying a plurality of parameters, wherein the plurality of parameters includes a retry rate;
determining a set of retry packets, wherein the plurality of packets transmitted on the channel includes the retry packets;
determining a subset of the set of retry packets, wherein the subset of the set of retry packets excludes retry packets from the set of retry packets that are determined to be invalid;
determining the retry rate using the channel data for the subset of the set of retry packets;
comparing the identified parameters to threshold values to determine which parameters exceed their respective threshold values; and
calculating a quality metric based on the parameters that exceed their respective threshold values, wherein the two more of the plurality of parameters includes the retry rate.

11. The computing device of claim 10, further comprising instructions, which when executed by the one or more processors, cause the computing device to perform operations including:
setting a threshold transmission rate for the set of retry packets transmitted on the channel,
wherein determining the subset of the set of retry packets includes determining which retry packets are transmitted at or below the threshold transmission rate.

12. The computing device of claim 11, wherein determining the subset of the set of retry packets includes excluding invalid retry packets from the set of retry packets transmitted above the threshold transmission rate.

13. The computing device of claim 10, wherein determining the subset of the set of retry packets includes excluding invalid retry packets from the set of retry packets based on management or control traffic.

14. The computing device of claim 10, wherein calculating the quality metric includes using a noise floor offset for the channel or an interference measure for the channel.

15. The computing device of claim 14, wherein when calculating the quality metric includes using the noise floor offset, the noise floor offset is computed based on a difference between a measure noise floor value and a nominal noise floor value.

16. The computing device of claim 10, wherein calculating the quality metric includes assigning a weight to a value representing the retry rate and assigning a weight to a value representing another parameter of the plurality of parameters.

17. The computing device of claim 16, wherein calculating the quality metric includes calculating a weighted sum of the parameters using the weight assigned to the retry rate, the value assigned to the retry rate, the weight assigned to another parameter, and the value representing another parameter.

18. The computing device of claim 16, wherein the sum of the weights assigned to the parameters used to analyze a channel quality of the channel equals 1.

19. A system comprising:
one or more processors; and
a memory having instructions stored thereon, which when executed by the one or more processors, cause the computing device to perform operations including:
receiving, by a network device on a network, channel data for a plurality of packets transmitted on a channel of the network;
identifying a plurality of parameters, wherein the plurality of parameters includes a retry rate;
determining a set of retry packets, wherein the plurality of packets transmitted on the channel includes the retry packets;
determining a subset of the set of retry packets, wherein the subset of the set of retry packets excludes retry packets from the set of retry packets that are determined to be invalid;
determining the retry rate using the channel data for the subset of the set of retry packets;
comparing the identified parameters to threshold values to determine which parameters exceed their respective threshold values; and
calculating a quality metric based on the parameters that exceed their respective threshold values, wherein the two more of the plurality of parameters includes the retry rate.

20. The system of claim 19, wherein the operations further include:
setting a threshold transmission rate for the set of retry packets transmitted on the channel,
wherein determining the subset of the set of retry packets includes determining which retry packets are transmitted at or below the threshold transmission rate.

21. The system of claim 20, wherein determining the subset of the set of retry packets includes excluding invalid retry packets from the set of retry packets transmitted above the threshold transmission rate.

22. The system of claim 19, wherein determining the subset of the set of retry packets includes excluding invalid retry packets from the set of retry packets based on management or control traffic.

23. The system of claim 19, wherein calculating the quality metric includes using a noise floor offset for the channel or an interference measure for the channel.

24. The system of claim 23, wherein when calculating the quality metric includes using the noise floor offset, the noise floor offset is computed based on a difference between a measure noise floor value and a nominal noise floor value.

25. The system of claim 19, wherein calculating the quality metric includes assigning a weight to a value representing the retry rate and assigning a weight to a value representing another parameter of the plurality of parameters.

26. The system of claim 25, wherein calculating the quality metric includes calculating a weighted sum of the parameters using the weight assigned to the retry rate, the value assigned to the retry rate, the weight assigned to another parameter, and the value representing another parameter.

27. The system of claim 25, wherein the sum of the weights assigned to the parameters used to analyze a channel quality of the channel equals 1.

* * * * *